(12) United States Patent
Burkhead

(10) Patent No.: US 7,270,249 B1
(45) Date of Patent: Sep. 18, 2007

(54) PNEUMATIC METERING APPARATUS FOR FLOWABLE SOLIDS PRODUCT

(76) Inventor: Ronnie J. Burkhead, 2345 Oaks Rd., Paducah, KY (US) 42003

( * ) Notice: Subject to any disclaimer, the term of this patent is extended or adjusted under 35 U.S.C. 154(b) by 450 days.

(21) Appl. No.: 11/073,310

(22) Filed: Mar. 3, 2005

(51) Int. Cl.
B67D 5/14 (2006.01)

(52) U.S. Cl. .......................................... 222/58; 406/92

(58) Field of Classification Search .................. 222/58, 222/52, 53, 57, 261–263, 77, 129.3, 152, 222/153.1, 181.5, 251; 406/91–95, 75, 14, 406/15, 16, 30, 33, 113
See application file for complete search history.

(56) References Cited

U.S. PATENT DOCUMENTS

| | | | |
|---|---|---|---|
| 4,524,886 A * | 6/1985 | Wilson et al. ................. | 222/58 |
| 4,863,316 A * | 9/1989 | Gianella et al. .............. | 406/14 |
| 4,893,262 A * | 1/1990 | Kalata ......................... | 700/305 |
| 4,938,385 A * | 7/1990 | Hayashi ........................ | 222/55 |
| 5,356,577 A | 10/1994 | Boldis et al. | |
| 5,803,673 A | 9/1998 | Reinsch et al. | |
| 6,273,153 B1 * | 8/2001 | Reinsch ........................ | 141/65 |
| 6,310,454 B1 * | 10/2001 | Moran et al. ................ | 318/560 |
| 6,368,028 B1 | 4/2002 | Nester | |
| 6,425,529 B1 | 7/2002 | Reinsch et al. | |
| 6,461,086 B1 * | 10/2002 | Milanowski et al. ......... | 406/92 |
| 6,702,152 B1 * | 3/2004 | Ludescher .................... | 222/77 |
| 6,713,126 B2 * | 3/2004 | Kreider ...................... | 427/180 |
| 6,719,500 B2 * | 4/2004 | Pfeiffer et al. ................ | 406/91 |
| 7,144,203 B2 * | 12/2006 | Gerber ......................... | 406/14 |
| 7,175,048 B2 * | 2/2007 | Wolfschaffner .............. | 222/77 |

* cited by examiner

Primary Examiner—Lien M. Ngo
(74) Attorney, Agent, or Firm—Lloyd L. Zickert

(57) ABSTRACT

Apparatus for pneumatically metering flowable solids products to a conveying air stream without using mechanical metering devices. The apparatus includes an eductor receiving product from a hopper and connected to an air supply that is automatically adjustable in response to the weight of the product to produce a selected product flow rate.

12 Claims, 3 Drawing Sheets

PNEUMATIC METERING APPARATUS FOR FLOWABLE SOLIDS PRODUCT

This invention relates in general to an apparatus for pneumatically metering a flowable solids product to a conveying air stream line for obtaining a target feed rate without the use of any mechanical metering devices, and more particularly to a pneumatic metering apparatus for metering a flowable solids product from a continuously weighed hopper including an eductor driven by an air supply that is controlled by a programmable controller in response to the weight loss of the product from the hopper to deliver a target flow rate.

BACKGROUND OF THE INVENTION

Heretofore, it has been well known to meter flowable solids products by use of mechanical metering devices such as rotary valves, augers, airlocks, and the like. Inasmuch as many solids products are highly abrasive and create high-wear conditions for metering components having moving parts, high maintenance is required to maintain the integrity and operation of such systems. Further, maintenance of a system produces unwanted downtime. Moreover, the mechanical metering devices can cause mechanical shear of the product that is undesirable.

An example of a mechanical metering device employing a rotary valve is disclosed in U.S. Pat. Nos. 6,273,153 and 6,425,529, while an example of a mechanical airlock-type metering device is disclosed in U.S. Pat. No. 5,803,673. It has also been known to pneumatically convey flowable solids materials by use of an air supply and eductors, as shown in U.S. Pat. No. 6,368,028.

SUMMARY OF THE INVENTION

The present invention overcomes problems heretofore encountered in providing a metering system for flowable solids products that does not use metering devices having any mechanical moving parts. The system of the invention includes an eductor at the discharge end of a hopper driven by an air supply that is controlled by a programmable controller sensing the weight loss of product in the hopper and relating it to a set point to produce a predetermined flow rate of the flowable solids product to an application site. A bypass line diverts a part of the air supply from the eductor which is later reinjected into the metered product flow from the hopper to provide a constant and optimum conveying velocity for the metered product sufficient to maintain forward movement of the product in the conveying line.

For example, in boiler applications it is desirable to feed vermiculite to the fire side of the boiler to control deposition of combustion by-products on the boiler water tube fireside surfaces. Depending upon boiler operation, a desired flow rate of vermiculite at a pounds-per-minute rate would be fed to the fire side of the boiler. It will be appreciated that the apparatus of the invention may be used for metering and delivering other flowable solids products for other applications.

It will also be appreciated that the pneumatic metering device of the present invention is applicable for delivering a selected flow rate of a flowable solids product that may be wet or dry and which may be other than the vermiculite above mentioned.

The preferred embodiment of the present invention is capable of infinitely controlling the feed rate over an infinite range of flow depending upon air supply. For example, the system of the invention may deliver from zero to twenty pounds per minute of a flowable solids product to an application station.

The apparatus of the invention includes an eductor having a suction or product port, a motive air port and a discharge port. The product port is connected to the discharge end of a hopper, while the motive air port is connected to a motive air supply and the discharge port is connected to a discharge line carrying the mixture of air and product according to a selected flow rate. A control valve has an inlet connected to an air supply providing substantially constant air flow and an outlet to the motive air line of the eductor and an outlet to a bypass line for bypassing a part of the air supply around the eductor. The bypassed air is subsequently reinjected into the metered product stream for transporting the product to its worksite such as a boiler. A programmable logic controller senses the weight loss of product in the hopper and adjusts the control valve to produce a selected feed rate in the downstream feed line.

A vibrator is mounted on the hopper and triggered by the programmable controller in the event that a predetermined drop in the flow rate is sensed. An air hammer, triggered by the programmable controller, provides a spurt of high air pressure to the outlet of the hopper and the product port of the eductor in the event that the flow rate drops a further predetermined amount below that which triggers the vibrator. The use of a vibrator and/or an air hammer is optional, and may not be needed for some applications. Thereafter, if the flow rate drops below another predetermined amount or to zero, the programmable controller will trigger alarm systems to alert personnel for giving attention to the system.

Optionally, the eductor of the apparatus of the present invention may include a secondary inlet port that is connected to a sweep air line that goes to the interior of the hopper for collecting product dust and delivering it to the eductor which enhances the overall efficiency of the apparatus.

It is therefore an object of the present invention to provide a new and improved metering system for metering flowable solids products that does not include any mechanical parts.

A further object of the present invention is to provide a new and improved metering system for flowable solids products that does not include any mechanical metering devices and which can provide over a given range of flow rates an infinite adjustability of the flow rate between zero and the maximum.

A still further object of the present invention is to provide a metering apparatus for flowable solids products including an eductor receiving product from a hopper and a programmable controller sensing the weight loss of product from the hopper to control the level of motive air to the eductor and the feed rate of a pneumatically conveyed product.

Another object of the present invention is to provide a pneumatic apparatus for metering flowable solids products that does not include any mechanical metering devices and which is simple to set up and operate while providing low maintenance costs.

Other objects, features and advantages of the invention will be apparent from the following detailed disclosure, taken in conjunction with the accompanying sheets of drawings, wherein like reference numerals refer to like parts.

DESCRIPTION OF THE INVENTION

Figure 1:
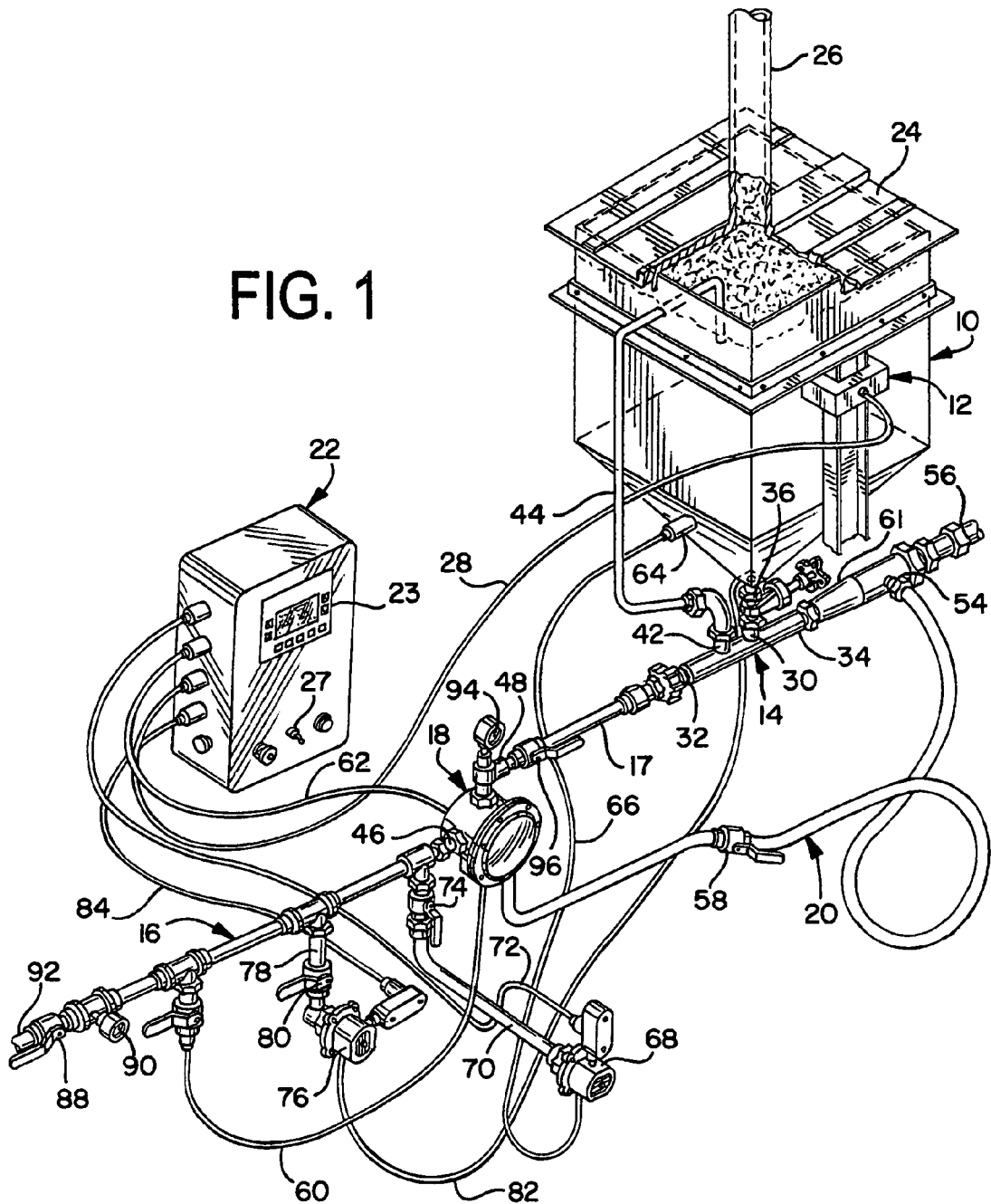
FIG. 1 is a diagrammatic perspective view of the apparatus according to the present invention showing the connections between the hopper, the eductor, the control valve, and the programmable controller.
Figure 2:
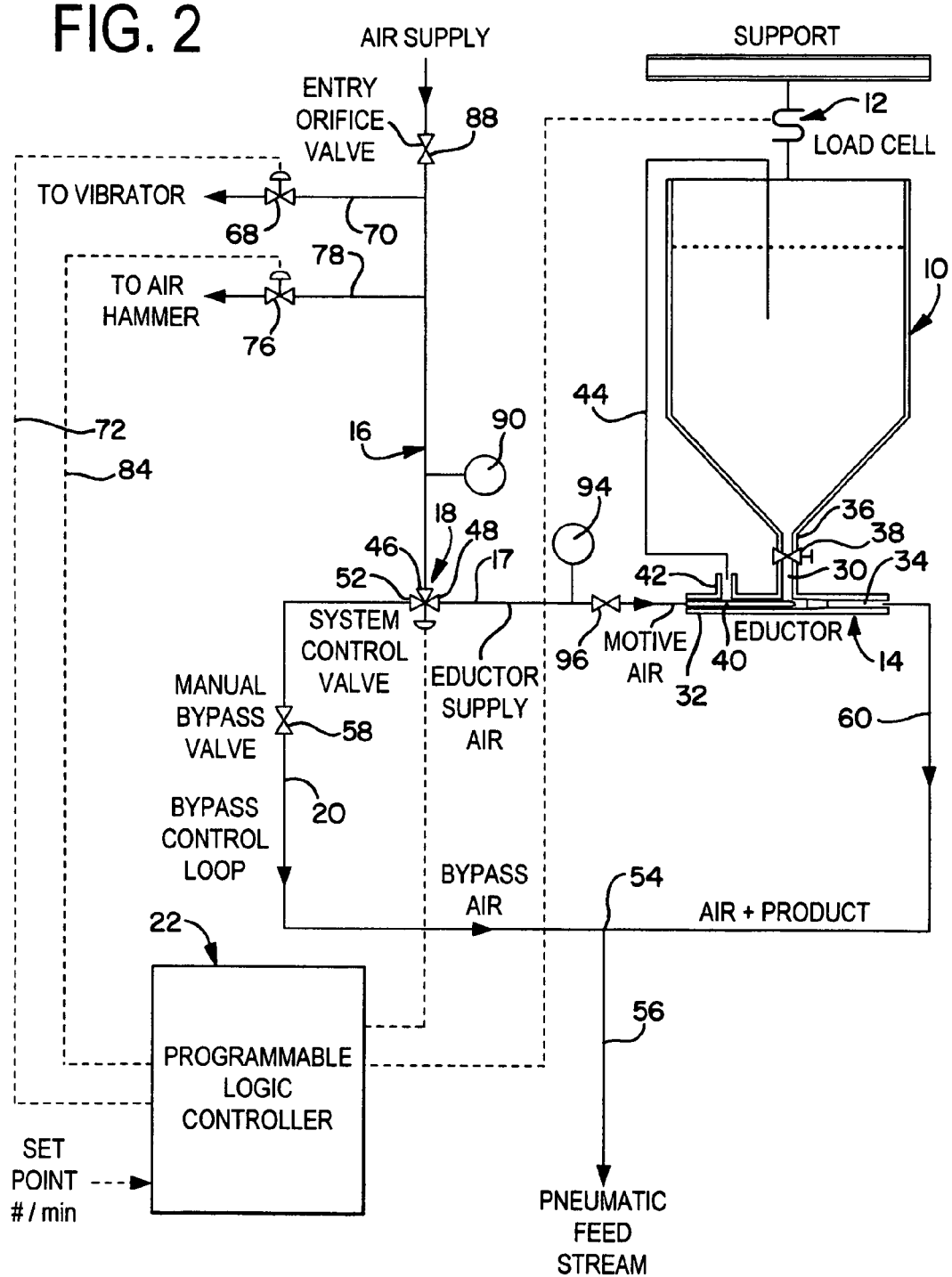
FIG. 2 is a schematic view of the metering apparatus of the present invention that does not include any mechanical parts in the metering section of the apparatus.
Figure 3:
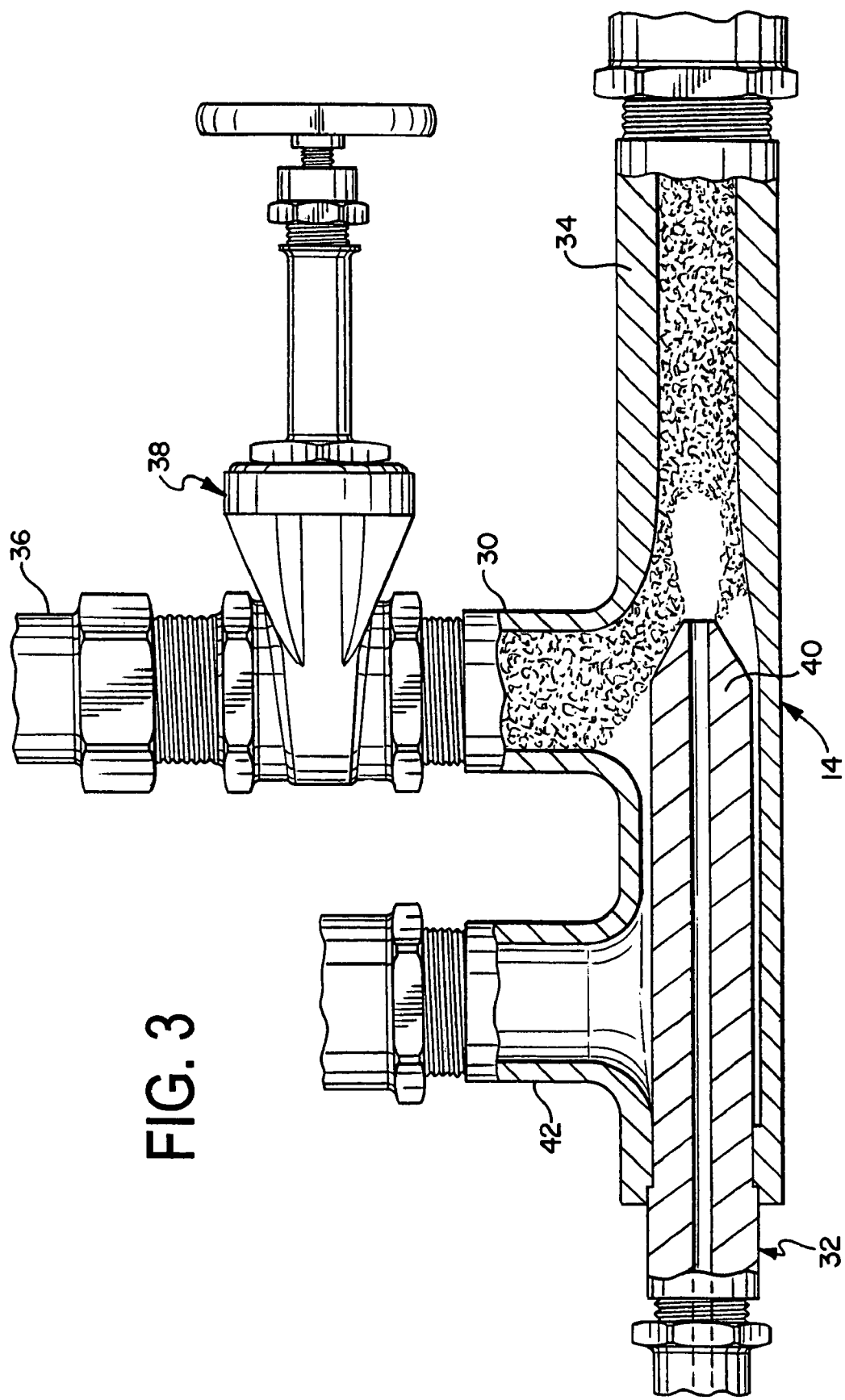
FIG. 3 is an enlarged side elevational view with some parts broken away of the eductor that is used in the metering apparatus of the present invention.

Referring now to the drawings, and particularly to FIGS. 1 and 2, the preferred embodiment of the metering apparatus of the invention for metering a flowable solids product to a conveying air stream line includes generally a hopper 10 suitably mounted in relation to a weighing device or scale 12 such as a load cell, an eductor 14 at the discharge end of the hopper for receiving product from the hopper, an air supply 16, an eductor air line 17, a control valve 18, an eductor air bypass line 20, and a programmable logic controller 22.

The hopper 10 is rectangular in configuration and includes a cover 24 that generally encloses the upper end of the hopper and contains dust emissions. However, the hopper may be otherwise configured, such as being cylindrical. An inlet pipe or conduit 26 is provided extending upwardly from the cover and would be in suitable communication with a supply station for the flowable solids product such that product would be gravitationally fed through the pipe 26 to fill the hopper when necessary. Any suitable source of product may be provided such as by shipping superbags of product to a station above the hopper and emptying the contents of the superbags into the conduit 26 for filling the hopper.

The hopper weighing device or load cell 12 may take any suitable form and be structurally related to the hopper for purposes of continuously weighing the hopper and delivering a weight value signal input to the programmable controller 22 through the sensing line 28. Accordingly, the weight of the hopper will be continuously monitored by the signal coming from the weighing device for the hopper. In the embodiment shown in FIG. 1, the weighing device is mounted at one side of the hopper and may be mounted on both sides if desirable, while in the schematic drawing of FIG. 2, the weighing device or load cell 12 is suspended from an overhead support and suitably connected to the hopper. Any suitable arrangement for continuously weighing the hopper may be used.

When replenishing product in the hopper by delivery through the conduit 26, the controller operation is sequenced by operation of the toggle switch 27 to lock the control valve 18 in place. Accordingly, during the hopper filling operation, the feed rate will be maintained. As soon as the filling operation is completed, the switch 27 is toggled to unlock the control valve to render it responsive to the weight of the product. Normally, the control valve will be locked up from about five to twenty minutes.

The eductor 14 includes generally a product or suction port 30, a motive air supply port 32 and a discharge port 34. The hopper includes an outlet 36 at the bottom end of the hopper that is connected by suitable piping to the product port 30 of the eductor. It will be understood the piping or lines connecting the components may be flexible, such as a suitable hose. A manually operable shutoff valve 38 that is normally open is mounted between the hopper outlet and the eductor product port for purposes of closing the hopper outlet during maintenance of the system. A venturi nozzle 40 is provided within the eductor for purposes of increasing the air pressure within the eductor and creating a suction force at the product port 30. The product of the hopper is primarily gravitationally fed to the eductor, and the eductor port is generally flooded with product. Preferably, the eductor includes a ceramic insert to enhance the life of the eductor, and it is contemplated the eductor will last up to twenty years.

A secondary port 42 ahead of the product port 30 is optionally provided for the eductor, wherein the secondary port is connected to a sweep air line 44 that extends upwardly around the outside of the hopper and back into the hopper, as shown in FIGS. 1 and 2. The sweep air line functions to collect the dust within the hopper and add it to the product being received directly from the outlet of the hopper. This sweep air line and secondary port are optional and when used can enhance the overall efficiency of the system.

The control valve 18 includes an inlet port 46 connected to the air supply line 16, an outlet port 48 connected to the motive air line 17 leading to the motive air port 32 of the eductor, and an outlet port 52 connected to the air supply or eductor bypass line 20 that goes to a tee fitting 54. At the tee fitting, bypass air is reinjected into the discharge stream of air and product coming from the discharge end of the eductor 14, thereby producing metered flow of product in a constant velocity conveying air stream line 56. The conveying air stream line provides the desired flow rate of product to the site where the product is to be used, such as the fireside of a boiler as mentioned in the introductory part of the specification. A manual bypass valve 58 is provided in the eductor bypass line 20 to balance the air flow resistance factor in the motive air stream and the bypass air stream.

For operating the three-way control valve 18, it is provided with an operating source of air for position control from the air supply through line 60, as seen in FIG. 1. A standard pipe union or suitable fitting 61 connects the discharge port 34 of the eductor and the tee fitting 54 through which the metered product is delivered from the eductor and hopper.

The programmable logic controller 22 includes a suitable microprocessor programmed to form all data manipulations in response to the incoming weight value signal from the hopper on the line 28 and the settings made at a keypad 23 on the controller 22. An outgoing signal line 62 from the controller goes to the control valve 18 for positioning the valve and setting the level of the motive air.

A vibrator 64 is provided on the hopper, and is operable to enhance the flow of the product when necessary, particularly if the product is wet. An air line 66 extends from the vibrator to an outlet of a solenoid operated valve 68 having an inlet connected to the air supply line 16 by a pipeline 70. The solenoid of the solenoid valve 68 is connected to a signal line 72 coming from an output of the controller 22. A manual shutoff valve 74, shown in its open position in FIG. 1, is provided in the line 70 for disabling the vibrator or shutting it down for maintenance. It will be appreciated the vibrator is optional, and may not be needed for some systems.

Additionally, an air hammer may be provided and triggered to overcome pluggage in the hopper outlet by the energization of a solenoid valve 76 connected to the air supply line 16 by a line 78 having a shutoff valve 80. As shown in FIG. 1, the shutoff valve is in its closed position. The valve 80 would be open when it is desired to utilize the air hammer if needed. An air line 82 extends from the outlet of the solenoid valve 76 to the outlet 36 of the hopper. A signal line 84 is connected between the programmable controller 22 and the solenoid of the solenoid valve 76. Like the vibrator, it is appreciated the air hammer, which can produce intermittently or otherwise an air slug into the hopper outlet and/or the eductor product port to relieve pluggage, is optional, and may not be needed for some applications.

It will be appreciated that either compressed air or blown air can be used with the apparatus of the invention to provide the necessary air supply. Compressed air is usually readily available from a plant that would employ the apparatus of the invention. The pneumatic conveyance of a flowable solids product requires a minimum velocity of air. It will be appreciated that the air flow into the conveyance system of the invention is maintained near constant by establishing a fixed flow of air at the air entry point by the adjustment of a manual entry orifice valve 88.

An air pressure gauge 90 is provided in the air supply line 16 to measure the pressure at the outlet of the entry orifice valve 88.

The air pressure at the outlet of the control valve 18 in the motive air line 17 is measured by a pressure gauge 94. A valve 96 is provided in the motive air line 17 for cutting off the pressure during maintenance of the eductor. Thus, air flow into the air supply line 16 is maintained near constant by adjusting the entry orifice valve 88 and which is set to assure that the total air flow of the combined motive air and bypass streams is sufficient and optimal to maintain product movement. It will be appreciated that a constant combined $C_v$ three-way control valve will be employed which simplifies the set up and assures more positive and absolute product flow as well as a wider feed range. The wider range makes possible a zero pounds-per-minute feed rate to a maximum pounds-per-minute feed rate up to about twenty pounds per minute using a conventional two-inch eductor. Using larger eductors, the upper feed limit of the system can approach any possible and practical rate. Thus, the three-way control valve 18 assures a more positive and absolute control of product flow along with a wider feed range and splits the total air flow into the motive air to the eductor and the bypass air in the eductor bypass line while maintaining a constant total air flow for optimal conveyance velocity.

In operation, when an air supply is connected to the control valve 18, the programmable controller is placed in manual mode and set to zero percent to direct one hundred percent of the air flow through the eductor. The entry orifice valve 88 is opened until feed of product is about 1.3 to 1.5 times the maximum desired feed rate of product, thereby assuring that the system will be able to attain and control the maximum feed of product needed at any time.

The air pressure just ahead of the eductor is noted and recorded. If necessary, the manual valve 88 may be opened further to attain the minimum required air flow to assure minimum velocity needed for product transport as indicated by the motive air pressure on the eductor with zero bypass.

The control valve 18 is then opened to one hundred percent with the controller still in manual mode to divert all of the air to the eductor bypass line where the air to the eductor is reduced to zero percent or no flow. The manual valve 58 in the bypass air loop is adjusted to match the bypass air pressure identical to the pressure noted ahead of the eductor in the previous step. This balances and equalizes the system to thereby assure constant total air flow at all valve positions.

The programmable controller is now placed in automatic mode which allows the controller to control the feed rate by manipulating the position of the control valve 18 in response to the weight loss in the hopper. It will be appreciated that flow of product is increased by increasing the eductor air and decreasing the bypass air while product flow is decreased by decreasing the eductor air and increasing the bypass air.

A loss in rate offset value from the set point, in pounds per minute, preset and adjustable at the controller 22 by operation of the keypad 23, is used to activate the vibrator circuit through a signal going to the vibrator solenoid 68, triggering the vibrator to vibrate the hopper cyclically until the target feed rate again returns to an offset value less than the triggering offset value. If the vibrator does not restore the target feed rate and the offset or decrease in flow reaches a second, larger offset value from set point, in pounds per minute, preset and adjustable at the controller 22 by operation of the keypad 23, the air hammer circuit is activated through a signal going to the air hammer solenoid valve 76 to inject small air blasts intermittently at preset and adjustable intervals into the hopper outlet and suction port of the eductor to clear any pluggage at the eductor.

In the event that energization of the vibrator and the air hammer fails to correct the offset from the target feed rate and the offset reaches a third, larger offset value from set point, in pounds per minute, preset and adjustable at the controller 22 by operation of the keypad 23, the system goes into an "alarm" mode, at which point an appropriate alarm sequence notifies an operator or technician, and/or other personnel concerned with the operation of the system, that the system needs attention. Such notification can be to one or more cell or land-line phones of one or more technicians as needed in order to provide the necessary maintenance to the system. The offsets of 0.5, 1.0 and 2.0 pounds per minute may be typical for a system feeding five to ten pounds per minute, but can be adjusted for higher or lower feed ranges as deemed appropriate.

While not shown, the apparatus may be modified by omitting the three-way valve between the air supply, the motive air line and the bypass air line, and including a two-way control valve in the bypass line. This embodiment, while capable of varying the flow rate, will not produce the infinite flow rate adjustability as in the preferred embodiment.

It will therefore be appreciated that the metering apparatus of the present invention which does not use any movable parts in the metering of the product when in operation, and is powered by an air supply, will have low maintenance costs, and a simplicity of setup and operation provides an improved apparatus for metering the feed of flowable solids products.

It will be understood that modifications and variations may be effected without departing from the scope of the novel concepts of the present invention, but it is understood that this application is to be limited only by the scope of the appended claims.

The invention claimed is:

1. Apparatus for pneumatically metering a flowable solids product to a conveying air stream line to obtain a target feed rate without the use of any mechanical parts, said apparatus comprising:
   an air supply,
   a hopper for storing a flowable solids product, said hopper having an outlet at the bottom thereof for discharging product therefrom,
   means for substantially continuously weighing said hopper to measure the weight of the stored flowable solids product,
   an eductor having a product port, a motive air port, and a discharge port, means connecting said eductor product port to said hopper outlet for receiving the flowable solids product, an eductor bypass line, means connecting said eductor bypass line to the conveying air stream line, an eductor discharge line connected to said eductor discharge port for receiving a metered amount of the flowable solids product, means connecting said eductor discharge line to said conveying air stream line into which the metered flowable solids product is fed, and means between said air supply and said eductor motive air port and said eductor bypass line responsive to the weight of the product in the hopper for controllably bypassing a portion of the air supply to substantially maintain the target feed rate of the flowable solids product at said eductor discharge port and conveying air stream line.

2. The apparatus of claim 1, wherein said means for controllably bypassing a portion of the air supply includes an adjustable control valve.

3. The apparatus of claim 2, wherein said adjustable control valve includes a three-way valve having an inlet connected to the air supply, an outlet connected to the eductor motive air port, and an outlet connected to the eductor bypass line.

4. The apparatus of claim 3, wherein said three-way valve is a constant $C_v$ valve.

5. The apparatus of claim 3, which further includes a programmable controller for setting said adjustable control valve to substantially maintain the target feed rate of said flowable solids product to said conveying air stream line.

6. The apparatus of claim 2, which further includes a programmable controller for setting said adjustable control valve to substantially maintain the target feed rate of said flowable solids product to said conveying air stream line.

7. The apparatus of claim 6, wherein said hopper includes a vibrator for assisting the flowability of said product between the hopper and the eductor, and said controller having means responsive to the target feed rate to trigger operation of said vibrator when the product feed rate falls below the target feed rate by a predetermined amount.

8. The apparatus of claim 7, which further includes an air hammer for injecting an air blast into the hopper outlet and/or the eductor product port in the event the product feed rate falls a predetermined amount below the product feed rate at which the vibrator is triggered.

9. The apparatus of claim 1, which further includes a sweep air line having one end within the hopper and connected at the other end to a secondary port of the eductor.

10. The apparatus of claim 9, wherein said secondary port is positioned ahead of said eductor product port.

11. A method of pneumatically metering a flowable solids product to a conveying air stream line to obtain a target feed rate without the use of any mechanical parts, said method comprising:

storing a flowable solids product in a hopper, wherein said hopper includes an outlet at the bottom thereof for discharging product therefrom, continuously weighing said hopper to measure the weight of the stored flowable solids product, feeding the product from the hopper to the product port of an eductor, wherein said eductor also includes a motive air port, and a discharge port, feeding an air supply to said eductor motive air port, delivering said product from said eductor discharge port to the conveying air stream line, bypassing air to said eductor motive air port in response to the weight of product in the hopper for controlling the target feed rate of the flowable solids product to said conveying air stream.

12. The method of claim 11, wherein said step of bypassing air includes operating a programmable logic controller.

* * * * *